United States Patent Office 3,321,395
Patented May 23, 1967

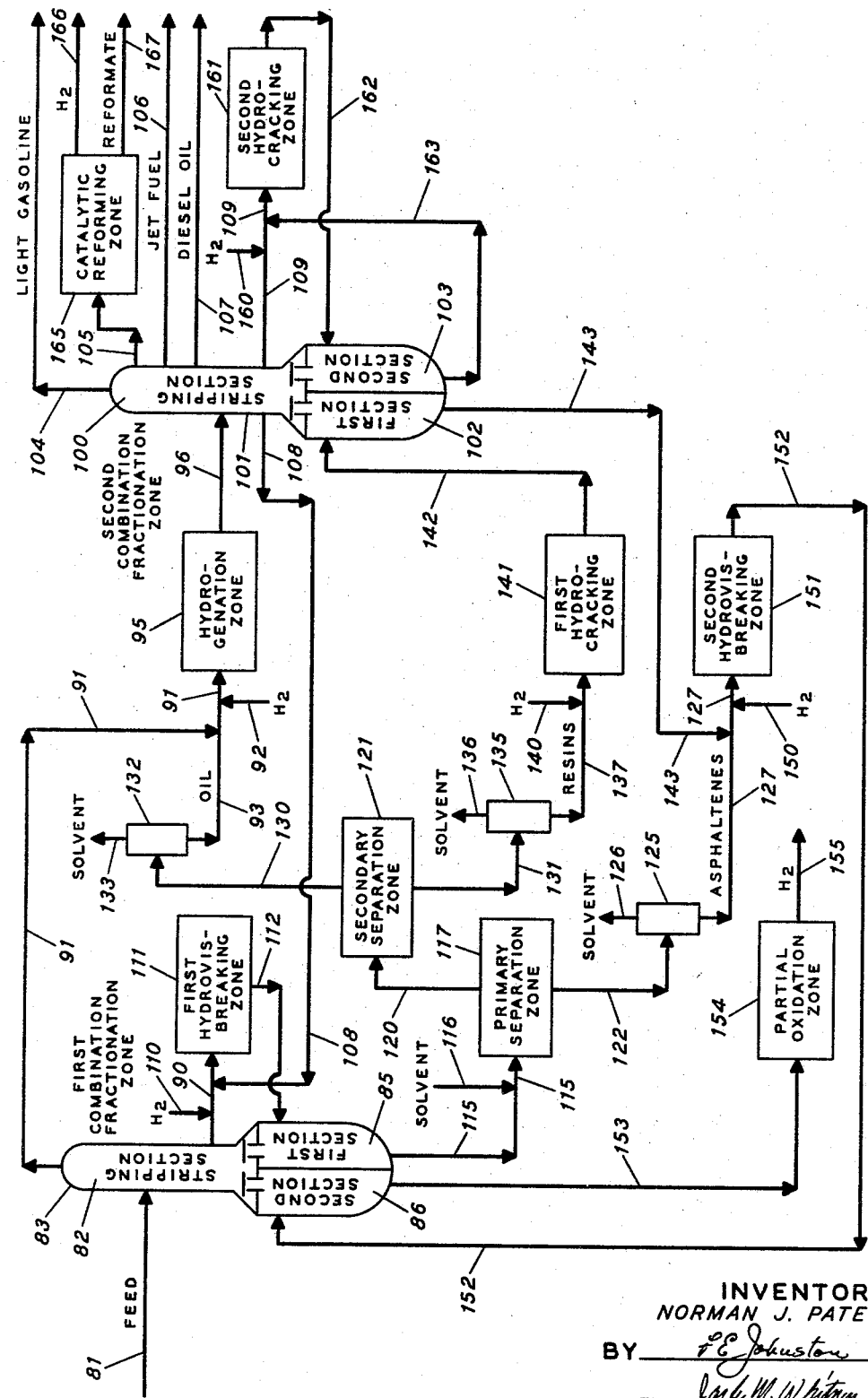

3,321,395
HYDROPROCESSING OF METAL-CONTAINING
ASPHALTIC HYDROCARBONS
Norman J. Paterson, San Rafael, Calif., assignor to Chevron Research Company, a corporation of Delaware
Filed June 3, 1965, Ser. No. 461,082
13 Claims. (Cl. 208—78)

INTRODUCTION

The present invention is directed to a process for converting a hydrocarbon feed containing asphaltic and metalliferous materials to obtain more valuable products. More particularly, this invention is directed to a process for separating metal-containing asphaltic feeds into solvent-separated oil, resin and asphaltene fractions and converting at least one of the fractions to more valuable products. Still more particularly, this invention is directed to a process for converting and separating metal-containing asphaltic feeds into hydrovisbroken fractions and solvent-separated fractions and separately hydroprocessing each of the fractions to obtain salable products including gasoline and middle distillates.

DEFINITIONS

The terms "oil fraction," "resin fraction" and "asphaltene fraction" used many times throughout this specification are defined at the outset to facilitate understanding of the subsequent description.

The oil, resin and asphaltene fractions refer to broad categories of constituents in bituminous materials. The exact composition of each fraction is dependent on the particular asphalt-type bituminous materials used as feed and the particular solvent and conditions used to carry out the feed separation. The three fractions differ in their physical and chemical behavior. The asphaltene fraction comprises weakly bound, high molecular weight polymers called asphaltenes. Asphaltenes are insoluble in petroleum ether, almost insoluble in 88° Baumé petroleum naphtha and alcohol, and soluble in benzol, chloroform and carbon disulfide. The resin fraction comprises non-polymeric materials called resins. Resins are completely soluble in 88° Baumé naphtha, chloroform, carbon disulfide and benzol. Resins surround the asphaltene molecules and have the tendency to readily polymerize into asphaltenes. It is this tendency to polymerize that creates grave problems in the processing of an asphaltic feed. The oil fraction is the fraction that remains after the resins and asphaltenes have been removed from the asphaltic feed. The average molecular weight and structural complexity of the three fractions increase from the oil fraction to the resin fraction to the asphaltene fraction. However, it must be recognized that there are borderline constituents which may fall into one or the other fraction depending on the kind of solvent used in separating the asphaltic feed. When an asphaltic feed is treated with a normal pentane solvent, the undissolved constituents precipitating out of solution are called "normal pentane asphaltenes." That portion of the asphaltic feed which is soluble in the normal pentane solution is called the maltene fraction and consists of the resin and oil constituents. The resin fraction may be precipitated from the maltene fraction by increasing the temperature of the separation system, thus leaving the oil fraction in the solvent solution. Resins may be defined as those constituents in the maltene fraction which, when mixed with fuller's earth, remain insoluble to normal pentane, but are soluble in ethyl ether. The oil constituents are those constituents in the maltene fraction which are soluble in normal pentane when the fraction is mixed with fuller's earth.

PRIOR ART PROBLEMS

The petroleum refiner currently faces the problem of processing high boiling feed stocks containing asphaltenes and metalliferous contaminants to obtain a high yield of salable products including gasoline and middle distillates. The processing is especially difficult where the feed stocks contain 2 wt. percent or more asphaltenes and 25 p.p.m. or more metals, usually comprising nickel and vanadium. One cannot process such feed stocks in conventional catalytic cracking or hydrocracking zones for long periods because the asphaltenes and metals rapidly coke and poison the cracking catalyst.

The prior art shows various hydrocracking processes to convert residual oils into more valuable products, including middle distillates and gasoline. Two-stage processes are required in which the first stage is used to hydrocrack the higher boiling materials into lower boiling materials and the second stage, containing a more active hydrocracking catalyst, is used to convert the lower boiling materials into the desired products. However, by hydrocracking in this manner one cannot economically hydrocrack residual oils from many of the well known types of crude oils containing relatively large amounts of asphaltenes and metalliferous contaminants because of the rapid catalyst deactivation.

The prior art shows various hydrocracking processes to convert residual oils into more valuable products. Visbreaking has been found to be an effective method for converting residual oils to gasoline and middle distillates. However, by visbreaking alone one cannot achieve the desired high yield of salable products. This is true because if one tries to increase the yield in visbreaking operation the production of unstable fuel oil and tar increases and the amount of coke in the visbreaking apparatus increases. That is, at the higher severities necessary to increase the yield of visbroken oil products, undesirable polymerization and condensation reactions occur to form the undesirable fuel oil, tar and coke.

The prior art shows operating thermal cracking processes in the presence of hydrogen and hydrogen donor diluents at high pressure to minimize coke formation and to produce more valuable products. However, by operating in such a manner one cannot economically convert the desired residual oils containing substantial quantities of asphaltenes to high yields of salable products.

The prior art shows various deasphalting processes to convert asphaltic feeds into substantially asphaltene-free, metal-free deasphalted oils which can be subsequently converted to more valuable products by catalytic cracking or hydrocracking. However, by deasphalting alone one cannot obtain a high yield of asphaltene-free oils having metal levels sufficiently low, i.e., less than 2 p.p.m. and preferably less than 1 p.p.m., to be used as feed to catalytic crackers. This is true because as one increases the yield of deasphalted oil the metal level of the oil increases. Consequently, it is necessary in the prior art processes to reject considerable quantities of potential catalytic cracker feed to asphaltenes.

The prior art also shows subjecting asphaltene-containing reduced crudes to conventional visbreaking, deasphalting and hydrogenating processes in order to obtain gasoline and middle distillates. However, by this combination of processes one still cannot economically produce the desired high yield of salable products at the expense of asphaltenes.

ADVANTAGES

In contrast to these prior processes, the process of the present invention has the advantage of obtaining a more economic and efficient conversion of a metal-containing asphaltic feed into substantially metal-free products. This invention provides improvements over known catalytic and noncatalytic conversion processes whereby the feed is solvent separated into a substantially metal-free oil fraction, a metal-containing resin fraction, and an asphaltene fraction containing the remaining portion of the metalliferous contaminants in the feed and separately hydroprocessing the fractions to more economically convert the fractions into an exceptionally high yield of high quality products including gasoline and middle distillates.

STATEMENT OF INVENTION

These and other advantages are obtained in the process of the present invention, which comprises separating in a solvent separation zone a hydrocarbon feed, boiling at least partly above 900° F. and containing asphaltenes and metalliferous contaminants, into an oil fraction, a resin fraction and an asphaltene fraction, removing from at least a portion of the resin fraction at least 50 wt. percent of the metalliferous contaminants contained in the portion in a hydrotreating zone in the presence of hydrogen with a hydrotreating catalyst comprising at least one hydrogenating component and a cracking component having no more than weak acidity and recovering from the effluent from the hydrotreating zone at least one product substantially free of the metalliferous contaminants. The metalliferous contaminants in the hydrocarbon feed that cause the greatest difficulty on subsequent catalytic conversion operations include nickel and vanadium and the various compounds of nickel and vanadium. Therefore, it is these metalliferous contaminants that are of chief concern. The oil fraction from the solvent separation zone contains less than 25 p.p.m. of these metalliferous contaminants in the feed expressed as metals and is suitable as a feed to a hydrocracking zone. The resin fraction contains between 10 and 50 wt. percent of these metalliferous contaminants in the feed. The asphaltene fraction contains at least 50 wt. percent of these contaminants.

In one embodiment of the present invention a substantial portion of the metalliferous contaminants is removed from the resin fraction in a hydrocracking zone with a hydrocracking catalyst operating on a once-through basis at conditions to convert between 20–50 vol. percent of the portion of the resin fraction boiling above 900° F. to materials boiling below 900° F. The hydrocracking catalyst comprises the same components as the hydrotreating catalyst described in the preceding paragraph. Various materials are recovered from the effluent from the hydrocracking zone, including gasoline, middle distillates and a bottoms fraction boiling above 650° F. substantially free of the metalliferous contaminants. The bottoms fraction obtained when operating at these conditions usually contains less than 2 p.p.m. and preferably no more than 1 p.p.m. nickel plus vanadium.

In accordance with a more specific embodiment of the present invention, there is provided a process which comprises separating in the solvent separation zone a hydrocarbon feed boiling at least partly above 900° F. and containing at least 2 wt. percent asphaltenes and at least 25 p.p.m. of the metalliferous contaminants expressed as metals, into the oil fraction, the resin fraction and the asphaltene fraction, removing from the resin fraction at least 50 wt. percent of the contaminants in the resin fraction in the hydrocracking zone with the hydrocracking catalyst, recovering from the effluent from the hydrocracking zone the desired products and a hydrocracking zone bottoms fraction boiling above 650° F., converting in a thermal cracking zone in the presence of hydrogen between 10–50 vol. percent of the portion of the thermal cracking zone feed boiling above 900° F. to materials boiling below 900° F. The thermal cracking zone feed comprises the asphaltene fraction and at least a portion of the bottoms fraction recovered from the hydrocracking zone effluent. The hydrocracking zone bottoms fraction operating at these conditions is a highly cyclic material having a UOP "K" Characterization Factor below 11.25. This bottoms fraction is substantially free of nickel and vanadium if the hydrocracking zone is operated at between 20–50 vol. percent conversion as discussed in the preceding paragraph. However, when at least a portion of the bottoms fraction is converted, as it is in this specific embodiment, in the thermal cracking zone, where metalliferous contaminants are tolerated, the fraction does not have to be substantially free of nickel and vanadium. Thus, the conversion in the hydrocracking zone may be less than 20 vol. percent. It has been found that even at 1 vol. percent conversion, over 90 wt. percent of the nickel and vanadium can be removed from the resin fraction. At this level of metal reduction, the resulting hydrocracking zone bottoms fraction contains less than 25 p.p.m. nickel plus vanadium and a portion of which may be fed to a separate hydrocracking zone. The thermal cracking zone is operated at conditions to convert no more than 10 vol. percent of the thermal cracker feed to products boiling below 400° F.

In accordance with still another embodiment of the present invention, there is provided a process for obtaining high yields of gasoline and middle distillates, which comprises converting above 50 vol. percent of the portion of the hydrocarbon feed boiling above 900° F. to materials boiling below 900° F. in a first hydrovisbreaking zone in the presence of hydrogen and an added paraffinic hydrocarbon stock, separating from the effluent from the hydrovisbreaking zone at least one asphaltene-free fraction boiling below about 800° F. and a residuum fraction, and then converting the residuum fraction in accordance with one of the preceding embodiments of this invention. The first hydrovisbreaking zone is operated at conditions to convert no more than 15 vol. percent of the hydrocarbon feed to products boiling below 400° F. The paraffinic hydrocarbon stock used in the first hydrovisbreaking zone comprises hydrocarbons boiling above 500° F. having a UOP "K" Characterization Factor above 11.5.

DRAWINGS

This invention will be more clearly understood, and further objects and advantages thereof will be apparent from the following description when read in conjunction with the accompanying drawings:

FIG. 2 is a diagrammatic illustration of an embodiment of process units and flow paths, wherein combination fractionating, hydrovisbreaking, two-stage solvent separating, hydrogenating, hydrocracking, reforming and partial oxidizing operations are combined in an integrated processing arrangement.

FEED

Figure 1:
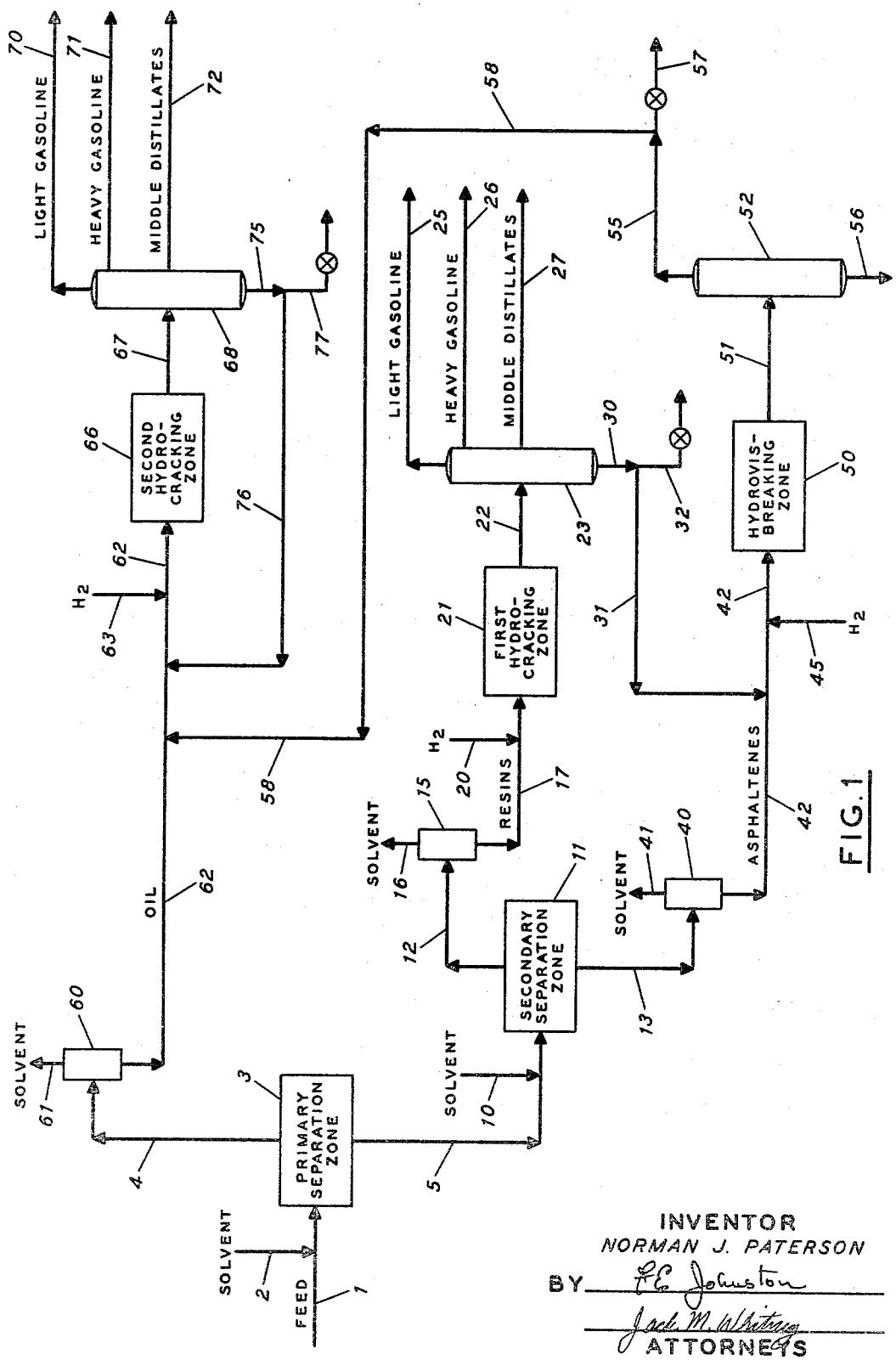
FIG. 1 is a diagrammatic illustration of process units and flow paths suitable for carrying out the process of the present invention, wherein two-stage solvent separating, hydrocracking, fractionating and hydrovisbreaking operations are combined in an integrated processing arrangement.

The feed stocks used in the process of the present invention include residual oils from a wide variety of petroleum crude hydrocarbons including Venezuelan, Californian, certain Middle Eastern and other crude oils that are particularly difficult to process. The process of this invention is also capable of converting residual oils recovered from shale, glisonite, tar sands, low temperature carbonization of coal and the like. The process is particularly effective in converting low gravity asphaltic and naphthenic hydrocarbons having at least 2 wt. percent asphaltenes and at least 25 p.p.m. metalliferous contaminants expressed as metals, usually comprising nickel and vanadium, and boiling at least partly above 900° F.

However, full boiling range crude oils may first be fed to a topping column to remove the fraction boiling below about 800° F. from the residuum fraction. The residuum fraction is then converted in a manner described above under "Statement of Invention."

Other desirable feeds used in the process of this invention include residual oil fractions boiling above about 650° F. recovered from the bottom of catalytic cracking fractionators. The fractionator bottoms fraction or "decant oil," as it is called, contains both paraffinic and condensed ring aromatic constituents. The aromatic constituents make the decant oil unsuitable for further catalytic cracking due to their severe coking tendencies. However, the decant oil is easily solvent separated into a paraffinic oil, an aromatic-resin and an aromatic-asphaltene fraction. The resin fraction is then hydrocracked to produce a highly cyclic bottoms fraction that is especially suitable as a diluent in the hydrovisbreaking of the asphaltene fraction.

Feeds that contain small but significant amounts of asphaltenes, i.e. less than 2 wt. percent such as Minas (Sumatra), Rio Zulia (Colombia) and Bahia (Brazil) crude oils, are highly paraffinic and hence are unsuitable as feeds directly to the first hydrovisbreaking zone of the present invention without prior pretreatment. The paraffins in such crude oils require very high temperatures to crack resulting in severe coking during hydrovisbreaking even in the presence of the paraffinic hydrocarbon stock.

HYDROVISBREAKING ZONE (1) *General.*—Hydrovisbreaking is used herein to mean thermal cracking a residual oil feed in the presence of hydrogen to convert at least a portion of the feed boiling above 900° F. to materials boiling below 900° F.

The hydrovisbreaking zone operation includes a tubular heating coil containing convection and radiant sections and, in certain applications, a soaking coil section. Preferably, the hydrovisbreaking zone consists of a reaction vessel and a tubular heating coil. The vessel contains baffles and contacting means to insure intimate mixing of the hydrovisbreaking zone feeds with either the paraffinic hydrocarbon stock or the cyclic hydrocracking zone bottoms, depending on the type of hydrovisbreaking that is desired. The heating coil is operated at conditions in the range of 600°–950° F., 100–3000 p.s.i.g. and a hydrogen recycle rate of 1000–10,000 s.c.f. per barrel of feed.

In at least one of the more specific embodiments of this invention the hydrovisbreaking is carried out in two separate zones of the type described in the preceding paragraph.

(2) *First hydrovisbreaking zone.*—The first hydrovisbreaking zone is operated at conditions to convert less than 15 vol. percent of the hydrovisbreaking zone feed to gasoline boiling below 400° F. and to convert above about 50 vol. percent and preferably between 55–65 vol. percent of the 900° F.+materials in the feed to materials boiling below 900° F. A large portion of the materials in the feed boiling over 775° F. is converted to middle distillates and gas oil boiling below about 775° F. The first hydrovisbreaking zone is designed to hydrogenate the unstable components in the feed in the presence of hydrogen and the added paraffinic hydrocarbon stock in order to prevent the polymerization and condensation of these components to coke and high boiling polymers. The paraffinic, high hydrogen content hydrocarbon stock and more preferably a hydrogenation zone bottoms, boiling above 500° F. having a UOP "K" Characterization Factor above 11.5 and preferably above 12.0 and containing less than 25 vol. percent aromatics, cause the asphaltene fractions in the first hydrovisbreaking zone feed to be preferentially cracked at relatively low temperatures, i.e., 600°–775° F., into oil and resin fractions. The less reactive resin and oil fractions in the feed are then reduced into lower boiling hydrocarbons with very little production of gasoline and lighter boiling materials.

The paraffinic hydrogenation zone bottoms are added to the feed to the first hydrovisbreaking zone in an amount of at least 1 volume per 10 volumes of feed. Below this amount little improvement results in the production of the desired asphaltene-free fractions. Above about 1 volume of hydrogenation zone bottoms per volume of feed little additional improvement results to warrant the expense in providing for such large quantities of bottoms.

(3) *Second hydrovisbreaking zone.*—The second hydrovisbreaking zone is operated at conditions to convert less than 10 vol. percent of the second hydrovisbreaking zone feed to gasoline boiling below 400° F. and to convert between 10–50 vol. percent of the 900° F.+materials in the feed to materials boiling below 900° F. The temperatures in the second hydrovisbreaking zone are lower than in the first hydrovisbreaking zone. By proper adjustment of temperature in the second hydrovisbreaking zone, one is able to convert the asphaltene fraction in the presence of hydrogen and the highly cyclic hydrocracking zone bottoms into a maximum yield of middle distillates and gas oils with a minimum production of gas, gasoline, and coke. The cyclic hydrocracking zone bottoms cause the asphaltene fractions in the second hydrovisbreaking zone feed to become solutized. This permits hydrogen transfer to take place between the solutized asphaltenes on the one hand and between the hydrogen in the system and the cyclic hydrogenated bottoms on the other in order to subsequently hydrogenate and decompose the solutized asphaltenes to middle distillates and gas oil. The cyclic hydrocracking zone bottoms boil above 650° F., have a UOP "K" Characterization Factor below 11.25 and preferably below 11.0 and contain greater than 25 vol. percent aromatics and/or naphthenes. The cyclic bottoms are added to the second hydrovisbreaking zone in amounts such that the total feed to the second hydrovisbreaking zone contains at least 30 vol. percent cyclic bottoms.

SOLVENT SEPARATION (1) *General.*—Solvent separation is provided in the process of this invention to separate either the fresh hydrocarbon feed or the residum from the first hydrovisbreaking zone into an oil fraction, a resin fraction, and an asphaltene fraction. The solvent separation may be a batch operation using one or more treating vessels or a continuous liquid-liquid countercurrent operation using a treating tower having baffles or rotating disc contactors. The asphaltic feed having an initial boiling point above about 600° F. and preferably above about 750° F. is introduced into the top of the particular vessel used and contacted with a suitable deasphalting solvent. The deasphalting solvent may be any of the conventional solvents and preferably such solvents as aliphatic hydrocarbons having between 2 and 8 carbon atoms per molecule or mixtures thereof. Certain additives such as aromatic wash oils, inorganic acids and halogens may be added to the solvent to improve the deasphalting operation by increasing the yield and quality of the deasphalted oil fraction which is substantially free of the metalliferous contaminants and asphaltenes.

(2) *Primary solvent separation zone.*—This primary separation zone may be operated to remove an asphalt fraction containing resins, asphaltenes and substantially all the metalliferous contaminants from the hydrocarbon feed and to produce the deasphalted oil fraction containing less than 25 p.p.m. of the contaminates expressed as metals. The preferred solvents for this deasphalting operation include ethane, ethylene, propane, normal butane, isobutane, propylene and butylene or mixtures thereof. A commercial deasphalting solvent mixture consists of 65 vol. percent propane and 35 vol. percent butanes. The preferred solvent to feed ratio used in this deasphalting operation is within the range of 2–12 volumes of solvent per volume of hydrocarbon feed. The treating tower used in this operation is operated at any suitable combination of temperatures and pressures such that the solvent remains in the liquid phase. The temperatures may be within a range of 100°–300° F. and the temperature gradient across the tower may be within the range of 0°–60° F. In a typical temperature profile, the top temperature is in the range of 210°–260° F. and the bottom temperature is in the range of 210°–250° F. The pressures are dependent on both the particular solvent used and on the composition of the feed, and hence in the range of 300–800 p.s.i.g.

Alternatively, the primary zone may be operated to remove the asphaltene fraction from the feed and to produce a maltene fraction. The solvent for this operation includes aliphatic hydrocarbons having higher molecular weights than those used in the deasphalting operation discussed in the preceding paragraph, i.e., normal butane, isobutane, isobutylene, normal butylene, normal pentane, hexanes, heptanes, octanes, or mixtures thereof. Solvents in this group retain a larger amount of resins with the oil fraction in the maltene extract phase than the $C_3$–$C_4$ solvents mentioned in the preceding paragraph. The temperatures in the treating tower of this operation are generally not greater than 50° F. below the critical temperature of the solvent used and hence in the range of about 150°–375° F. The other conditions are in the same range as those discussed in the preceding paragraph.

(3) *Secondary solvent separation zone.*—In the operation wherein a deasphalted oil is produced in the primary separation zone, the secondary separation zone is operated to separate the asphalt fraction into a resin fraction containing between 10–50 wt. percent of the contaminants in the feed to the primary zone and an asphaltene fraction containing the remainder of the contaminants, usually above 50 wt. percent and preferably above 70 wt. percent of the contaminants originally present in the primary zone feed. The solvent used in the secondary zone preferably is pentane and is added in the ratio of 2–12 volumes of solvent per volume of feed. The temperatures used in this zone are generally about 50°–100° F. higher than the temperatures used in the primary zone and hence in the range of 150°–400° F. The pressures used in this zone are generally lower than used in the primary zone and in the range of about 200–700 p.s.i.g.

In the alternative operation wherein the asphaltene fraction is removed from the primary zone feed, the secondary separation zone is operated to separate the resulting maltene fraction into the oil fraction and the resin fraction. The secondary zone in this alternative operation is maintained at the same pressure as in the primary zone and heated to the equilibrium temperature of the particular solvent at the given pressure in order to precipitate out the resins from the maltene extract phase. Equilibrium temperature is the actual saturation temperature of the solvent used at the given pressure, if the temperature is below the critical, and is the temperature corresponding to the given pressure as determined from a Cox vapor pressure curve, if the temperature is above the critical. For example, if the primary zone is operated with a n-pentane solvent at 250° F. and 525 p.s.i.g., the secondary zone is operated at 380° F. and 525 p.s.i.g.

HYDROGENATION

A hydrogenation zone is operated to produce a highly paraffinic hydrocarbon stock boiling above 500° F. used in the first hydrovisbreaking zone. The feed to the hydrogenation zone may be a full boiling range straight run or thermally cracked stock. The hydrogenation zone is operated under conventional hydrogenation conditions with a conventional hydrogenation catalyst. Representative operating conditions in the hydrogenation zone are 550°–750° F., 250–3000 p.s.i.g., 0.1–10.0 LHSV and a hydrogen recycle rate of 1000–5000 s.c.f. per barrel of feed. The hydrogenation catalyst comprises a hydrogenating-dehydrogenating component and a nonacidic cracking component. The hydrogenating component may be selected from the various Group VI and Group VIII metals and compounds thereof and mixtures thereof. The nonacidic cracking component may comprise such materials as silica, titania, zirconia, bauxite, charcoal, magnesia or alumina. The preferred hydrogenation catalyst comprises 1–6 wt. percent cobalt oxide, 6–20 wt. percent molybdenum oxide and 75–90 wt. percent alumina as prepared in a manner set forth in Patent No. 2,878,193. The hydrogen consumption rate for the full boiling range feed stocks to the hydrogenation zone is at least 700 s.c.f. per barrel of feed.

The hydrogenation zone also is operated to remove from the feed at least 99% of the sulfur and at least 80% of the nitrogen in the feed, and to saturate the olefins and aromatics in the feed. There is a conversion of 20–30 vol. percent of the 700° F.+ materials in the feed to 700° F.— materials because of the splitting reactions that occur during desulfurization and denitrification. However, the operating conditions are adjusted to limit the conversion to gasoline to less than 10 vol. percent.

HYDROCRACKING (1) *General.*—The hydrocracking is done in two or more separate hydrocracking zones operating under hydrocracking conditions of 400°–750° F., above 500 p.s.i.g. and preferably 800–3000 p.s.i.g., 0.2–15 LHSV and preferably 0.4–3.0 LHSV, and a hydrogen recycle rate of 1500–30,000 and preferably 3000–15,000 s.c.f. per barrel of feed with a hydrocracking catalyst. The catalyst comprises at least one hydrogenating-dehydrogenating component and an active cracking component. The hydrogenating component may be selected from the various Group VI and Group VIII metals and compounds thereof and mixtures thereof. The active cracking component may comprise such materials as silica, alumina, silica-magnesia, silica-alumina, zirconia, alumina-boria, and the like.

In at least one embodiment of the present invention, the hydrocracking is done in two separate hydrocracking zones.

(2) *First hydrocracking zone.*—The first hydrocracking zone is operated to remove at least 50 wt. percent of the metalliferous contaminants in the resin fraction from the secondary solvent separation zone. As discussed above under "Statement of Invention," it is preferable to operate this zone to remove metals as well as to convert at least a portion of the resin fraction to products including gasoline and middle distillates. The catalyst used in the first hydrocracking zone comprises at least one of the Group VI metals or compounds thereof and at least one of the Group VIII metals or compounds thereof and an active cracking component having no more than weak acidity. A preferred first hydrocracking zone catalyst combination comprises sulfides of nickel, sulfides of molybdenum and/or tungsten and either alumina containing no more than minor amounts of silica or silica-magnesia. Examples of such catalysts are (1) a sulfided catalyst comprising 4–10 wt. percent nickel, as metal, and 15.5–30 wt. percent molybdenum, as metal, and a substantially nonacidic component consisting essentially of alumina and (2) a sulfided catalyst comprising 2–20 wt. percent nickel, as metal, and 2–25 wt. percent tungsten, as metal, and a weakly acidic component comprising silica-magnesia. The weight percent metals are based on the total catalyst composite. The magnesia content in the silica-magnesia cracking component may range from 5–75 wt. percent, preferably from 15–20 wt. percent, and still more preferably from 20–35 wt. percent.

The resin fraction is combined with 1000–7000 s.c.f. of hydrogen per barrel of feed and hydrocracked on a once-through basis with a catalyst of the type mentioned in the preceding paragraph. The range of operating conditions are 650°–850° F., 500–3000 p.s.i.g., and 0.2–3.0 LHSV. The hydrogen consumption rate for the resin fraction to the first zone is at least 500 s.c.f. per barrel of feed.

(3) *Second hydrocracking zone.*—The second hydrocracking zone is operated to convert the oil fraction from the solvent separation zone and the hydrovisbroken fractions boiling below about 800° F. from the first and second hydrovisbreaking zones into products including gasoline and middle distillates. In at least one embodiment of this invention the oil and hydrovisbroken fractions are hydrogenated in the hydrogenation zone discussed above under "Hydrogenation." Thus, a portion of the bottoms from the hydrogenation zone is converted to the desired products in the second hydrocracking zone. The hydrocracking may be done in one or two stages depending on the nitrogen content of the feed to the hydrocracking zone and the particular catalyst used. Where the total nitrogen content of the second hydrocracking zone feed is in the range of 10 to 1000 p.p.m. and in some cases even more than 1000 p.p.m., the hydrocracking is done in a single stage with a catalyst having no more than weak acidity as discussed above under "(2) First Hydrocracking Zone." Where the nitrogen content of the feed is too high for the latter type of catalyst, the hydrocracking is done in two stages with the catalyst having no more than weak acidity in the first stage and a strongly acidic catalyst in the second stage of the type well known in the art. A particularly effective strongly acidic catalyst comprises nickel sulfide and silica-alumina as prepared in a manner set forth in 2,944,006.

The first stage of the second hydrocracking zone is operated to reduce the nitrogen content of the feed to the second stage below a level of nitrogen that can be tolerated in the second stage, preferably less than 5 p.p.m. and still more preferably less than 0.2 p.p.m. total nitrogen. Representative operating conditions in the first stage are 600°–850° F., 500–3000 p.s.i.g., 0.5–5.0 LHSV and a hydrogen recycle rate of 1000–10,000 s.c.f. per barrel of feed.

The second stage of the secondary hydrocracking zone is operated to convert at least 30 vol. percent of the portion of the feed boiling above 650° F. to materials boiling below 650° F. Representative operating conditions in the second stage are 550°–850° F., 800–3000 p.s.i.g., and 0.4–3.0 LHSV and a hydrogen recycle rate of 1000–10,000 s.c.f. per barrel of feed.

DESCRIPTION OF FIG. 1

Referring now to FIG. 1, an 8° API vacuum reduced crude oil feed, 90 vol. percent of which boils above 900° F., containing about 28 wt. percent n-pentane asphaltenes and about 160 p.p.m. nickel plus vanadium, is supplied through line 1, combined with a commercial propane-butane solvent through line 2 and passed to primary separation zone 3. A solvent-oil phase is removed from zone 3 through line 4 and an asphaltene fraction is removed from zone 3 through line 5, combined with n-pentane through line 10 and passed to secondary separation zone 11. A pentane-resin phase is removed from zone 11 through line 12 and an asphaltene-pentane phase is removed from zone 11 through line 13. The pentane-resin phase is passed through line 12 to solvent recovery zone 15. Pentane is removed from zone 15 through 16 and the resin fraction, containing about 15 wt. percent of the nickel plus vanadium in the reduced crude oil feed, is removed from zone 15 through line 17.

The resin fraction is combined with hydrogen through line 20 and passed to first hydrocracking zone 21. Ammonia, hydrogen sulfide, hydrogen and C₄-light gases are removed from the effluent from zone 21 in processing units not shown. The remaining effluent from zone 21 is passed through line 22 to fractionating column 23. A $C_5$–180° F. light gasoline fraction is recovered from the upper end of column 23 and passed through line 25 to product storage. A 180°–400° F. heavy gasoline fraction is removed as a side cut from column 23 and passed through line 26 to product storage or to further processing, such as catalytic reforming. A 320°–650° F. middle distillate fraction is removed as a side cut from column 23 and passed through line 27 to product storage or to further processing. The highly cyclic bottoms fraction boiling above 650° F. is removed from column 23 through line 30. All or a substantially portion of this bottoms fraction is passed through line 31 for further processing. A portion of this bottoms fraction may be withdrawn from the system through line 32.

The asphaltene-pentane phase is passed through line 13 to solvent recovery zone 40. The pentane is removed from zone 40 through line 41 and the asphaltene fraction containing about 80 wt. percent of the nickel plus vanadium in the reduced crude oil feed, is removed from zone 40 through line 42. The asphaltene fraction is passed through line 42, combined with at least a substantial portion of the hydrocracking zone 21 bottoms fraction through line 31 and hydrogen through line 45 and passed to hydrovisbreaking zone 50. The total feed to the zone 50 contains at least 30 vol. percent of the bottoms fraction. The effluent from zone 50 is passed through line 51 to fractionating column 52. A hydrovisbroken oil boiling below about 800° F. is removed from column 52 through line 55. An asphaltic residue is removed from column 52 and withdrawn from the system through line 56. The hydrovisbroken oil may be withdrawn from the system through line 57 or all or a portion of the hydrovisbroken oil may be passed through line 58 for further processing.

The solvent-oil phase through line 4 is passed to solvent recovery zone 60. The propane-butane solvent is removed through line 61 and the oil fraction boiling in the range above 600° F. to above 900° F. is removed through line 62. The oil fraction, 70 vol. percent of which boils above 900° F., has an API gravity of about 16.6 and contains about 12 p.p.m. nickel plus vanadium. The yield of the oil fraction is 55 vol. percent based on the reduced crude oil feed. The oil fraction is combined with hydrogen through line 63 and may be combined with all or a portion of the hydrovisbroken oil through line 58 and passed to second hydrocracking zone 66. Ammonia, hydrogen sulfide, and $C_4$-light gases are removed from the effluent from zone 66 in processing units not shown. The remaining effluent from zone 66 is passed through line 67 to fractionating column 68. A $C_5$–180° F. light gasoline fraction is recovered from the upper end of column 68 and passed through line 70 to product storage. A 180°–400° F. heavy gasoline fraction is removed as a side cut from column 68 and passed through line 71 to product storage or to further processing, such as catalytic reforming. A 320°–650° F. middle distillate fraction is removed as a side cut from column 68 and passed through line 72 to product storage or to further processing. The bottoms fraction is removed from column 68 through line 75. The hydrocracking zone 66 bottoms fraction may be recycled to zone 66 through line 76 or withdrawn from the system through line 77.

EXAMPLE

The resin fraction obtained in a manner described above under "Description of FIG. 1" was demetalized on a once-through basis in a fixed bed reactor in the presence of hydrogen with a sulfided catalyst comprising about 6.5 wt. percent nickel and about 22 wt. percent molybdenum on activated alumina, a non-acidic catalyst support. The resin fraction fed to the reactor had the following inspections:

| | |
|---|---|
| Gravity, °API | 6.3 |
| Nitrogen wt. percent | 1.3 |
| Sulfur wt. percent | 1.3 |
| Nickel p.p.m | ~70–80 |
| Vanadium p.p.m | 48 |
| Distillation, ASTM D–1160 | |
| LV percent: | °F. |
| Start | 789 |
| 5 | 916 |
| 10 | 980 |
| 20 | 1053 |
| 33 | 1094 |

Table I below indicates the operating conditions used in the reactor, the amount of hydrogen consumed in the reaction, the portion of the resin fraction boiling above 900° F. converted to materials boiling below 900° F. and the inspections of the total reactor effluent.

TABLE I

| | | |
|---|---|---|
| Operating Conditions: | | |
| Temperature, °F | 675 | 750 |
| Pressure, p.s.i.g | 2,400 | 2,400 |
| Space Velocity, LHSV | 0.5 | 0.5 |
| Recycle H$_2$ Gas Rate, s.c.f./bbl | 5,000 | 5,000 |
| H$_2$ Consumption, s.c.f./bbl | 680 | 1,250 |
| Conversion to 900° F., vol. percent | ~1 | ~26 |
| Inspections: | | |
| Gravity, °API | 10.5 | 15.2 |
| Nitrogen, wt. percent | 1.0 | 0.6 |
| Sulfur, wt. percent | 0.3 | 0.047 |
| Nickel, p.p.m | 5.5 | ~0.6 |
| Vanadium, p.p.m | 3.7 | <0.2 |

Table I indicates that, at conversions of about 26 vol. percent to materials boiling below 900° F., the total effluent from the reactor contained less than 1 p.p.m. nickel plus vanadium. Thus, the total effluent may be distilled to remove gasoline and middle distillates and the remaining effluent may be fed directly to a catalytic cracker or hydrocracker. Even at conversions of about 1 vol. percent, over 90 wt. percent of the nickel plus vanadium in the feed to the reactor was removed. The total reactor effluent at this conversion may be hydrovisbroken in hydrovisbreaking zone 50 of FIG. 1.

DESCRIPTION OF FIG. 2

Referring now to FIG. 2, 50,000 barrels per stream day (BPSD) of a 10.1° API Boscan (Venezuela) full boiling range crude oil is fed through line 81 into stripping section 82 of first combination fractionation zone 83. The crude oil contains about 65 vol. percent of materials boiling above 900° F., about 5.5 wt. percent sulfur, about 1200 p.p.m. vanadium, about 150 p.p.m. nickel, about 50 lbs. sodium chloride per 1000 barrels of crude, about 15 lbs. calcium sulfate per 1000 barrels of crude, and about 20 wt. percent of n-pentane asphaltenes. Preferably, the crude is treated in units not shown to remove the sodium chloride and calcium sulfate deposits. Fractionation zone 83 is constructed so that stripping section 82 is in vapor communication with first section 85 and second section 86, sections 85 and 86 are located in the bottom portion of zone 83, and a longitudinal partition is located between section 85° and section 86 to prevent liquid communication between the two sections. Heat is supplied to sections 85 and 86 via separate reboilers not shown. Section 82 is designed to strip as much of the full boiling range crude as possible without carrying any of the asphaltenes or metalliferous contaminants overhead or without decomposing the crude. A hydrogen-containing gas preferably is introduced into sections 85 and 86 through means not shown to aid in the stripping of the crude in section 82. About 35,500 b.p.s.d. of the stripped crude oil is removed from a total liquid draw-off tray at the lower end of section 82 through line 90.

About 41,000 b.p.s.d. of all the fractions boiling below about 775° F. from zone 83 are removed from the upper end of section 82 through line 91, combined with hydrogen in line 92 and with about 4500 b.p.s.d. of the oil fraction in line 93, and passed to hydrogenation zone 95. Ammonia, hydrogen sulfide, and C$_4$-light gases are removed from the effluent from zone 95 in processing units not shown. About 46,000 b.p.s.d. of the remaining effluent from zone 95 is passed through line 96 into stripping section 100 of second combination fractionation zone 101. Fractionation zone 101 is constructed with essentially the same features as fractionation zone 83. Thus, stripping section 100, first section 102 and second section 103 are in the same relationship as they are in zone 83. A C$_5$–180° F. light gasoline fraction is removed from the under end of section 100 through line 104 to a gasoline blending zone not shown. A 180°–320° F. heavy gasoline fraction is removed as a side cut from section 100 through line 105 to further processing. A 320°–525° F. jet fuel fraction is removed as a side cut from section 100 through line 106 to product storage. The jet fuel fraction has excellent thermal stability, an ASTM freeze point below −65° F. and an ASTM smoke point above 25. A 380°–650° F. diesel oil fraction is removed as a side cut from section 100 through line 107 to product storage. The diesel oil fraction has a cetane number above 55 and an ASTM pour point below 0° F. A highly paraffinic hydrogenation zone bottoms fraction boiling above 650° F. and containing at least 10 vol. percent of materials boiling above 1000° F. is removed from the total liquid draw-off tray at the lower end of section 100 through lines 108 and 109 to further processing.

The stripped crude oil through line 90 is combined with hydrogen through line 110 and 4200 b.p.s.d. of the paraffinic hydrogenation zone bottoms through line 108 and passed to first hydrovisbreaking zone 111. The effluent is removed from zone 111 through line 112 and passed into first section 85. The effluent from zone 111 is stripped with the hydrogen-containing gas to thoroughly remove the 775° F.-material. The efficiency of the subsequent solvent separation is improved if all the 400° F.-material and preferably all the 775° F.-material has been stripped from the hydrovisbroken fraction. The vaporized 775° F.-hydrovisbroken fraction is passed through vapor communication means between the upper end of section 85 and the lower end of section 82 and removed from the upper end of section 82 through line 91 with the other overhead fractions from zone 83.

About 14,200 b.p.s.d. of the stripped, hydrovisbreaker zone 111 bottoms fraction boiling above about 775° F. is removed from the lower end of section 85 through line 115, mixed with a commercial solvent comprising 65 vol. percent propane and 35 vol. percent butanes through line 116 and passed to primary separation zone 117. A solvent-maltene phase is removed from primary separation zone 117 and passed through line 120 to secondary separation zone 121. An asphaltene-solvent phase is removed from primary separation zone 117 through line 122 and passed to solvent recovery zone 125. The solvent is removed from zone 125 through line 126. About 5700 b.p.s.d. of the asphaltenes containing above 50 wt. percent of the nickel plus vanaduim in the zone 111 bottoms fraction are removed from zone 125 through line 127. A solvent-oil phase containing the more paraffinic constitutents in the zone 111 bottoms fraction is removed from secondary separation zone 121 through line 130. A resin-solvent phase is removed from zone 121 through line 131. The solvent-oil phase is passed through line 130 to solvent recovery zone 132. The solvent is removed from zone 132 through line 133. The 775° F.+ oil fraction containing less than 25 p.p.m. nickel plus vanadium is removed from zone 132 through line 93 and combined with the other overhead fractions through line 91. The resin-solvent phase is passed through line 131 to solvent recovery zone 135. The solvent is removed from zone 135 through line 136. About 4000 b.p.s.d. of the 775° F.+ resins containing less than 50 wt. percent of the nickel plus vanadium in the zone 111 bottoms fraction are removed from zone 135 through line 137.

The resins through line 137 are combined with hydrogen through line 140 and passed to first hydrocracking zone 141. Ammonia, hydrogen sulfide, hydrogen and $C_4$-light gases are removed from the effluent from hydrocracking zone 141 in processing units not shown. About 4200 b.p.s.d. of the remaining effluent from zone 141 is passed through line 142 into section 102. The vapors boiling below about 650° F. from section 102 are passed through vapor communication means between the upper end of section 102 and the lower end of section 100 and fractionated in section 100 into the respective fractions as indicated above in the first paragraph under "Description of FIG. 2." About 3200 b.p.s.d. of a highly cyclic hydrocarcking zone 141 bottoms fraction boiling above 650° F. is removed from section 102 and passed through line 143 to further processing.

The asphaltenes through line 127 are combined with the 3200 b.p.s.d. of the cyclic zone 141 bottoms fraction through line 143 and hydrogen through line 150 and passed to second hydrovisbreaking zone 151. The amount of conversion to materials boiling below 700° F. in zone 151 is limited in order to control the feed to partial oxidation zone 154. The effluent is removed from zone 151 through line 152 and passed into section 86. The effluent from zone 151 is stripped with the hydrogen-containing gas to accomplish either partial or thorough removal of the 700° F.-hydrovisbroken material depending on the feed requirements of zone 154. The 700° F.-hydrovisbroken fraction is passed through vapor communication means between the upper end of section 86 and the lower end of section 82 and removed from the upper end of section 82 through line 91 with the other overhead fractions.

About 5900 b.p.s.d. of the 700° F.+ hydrovisbreaking zone 151 bottoms fraction is removed from section 86 through line 153 and passed to partial oxidation zone 154. The bottoms fraction is preheated, mixed with oxygen and also preferably mixed with steam and passed to a gas generator in zone 154 operating at conventional conditions of 2000°–3000° F., and preferably 2200°–2800° F., and space velocities of at least 1000 s.c.f./hr./ft.³ of reactor volume, based on synthesis gas product. A synthesis gas of a composition well known in the art is recovered from the gas generator. The synthesis gas is quenched with water, passed to a shift converter in zone 154 in the presence of steam with an iron oxide catalyst to convert CO to $CO_2$. The gas from the shift converter is passed to a gas scrubber still in zone 154 and contacted with an amine solution to produce a hydrogen-containing gas comprising 90–95% hydrogen. The hydrogen-containing gas is removed from zone 154 through line 155 and passed to a hydrogen distribution system not shown to supply the overall process system with sufficient quantities of hydrogen. As stated in the preceding paragraph, the feed to zone 154 can be controlled and hence the amount of hydrogen produced can be controlled, by controlling the amount of conversion in zone 151 and the amount of stripping in section 86. Thus the overall process system can be kept in hydrogen balance.

The 180°–320° F. heavy gasoline fraction from section 100 is passed through line 105 to catalytic reforming zone 165 operating with a conventional catalytic reforming catalyst such as platinum on alumina and a 5–10 to 1 mole ratio of hydrogen to hydrocarbon feed at conventional operating conditions such as 800°–1100° F., 200–1000 p.s.i.g., and 0.5–5.0 LHSV. The hydrogen-containing gas produced in the reforming reaction is removed from zone 165 through line 166 and passed to the hydrogen distribution system mentioned in the preceding paragraph. A high octane reformate is removed from zone 165 through line 167 and passed to the gasoline blending zone. The reformate has an octane number of about 100–102 F–1+3 ml. TEL/gal.

In the gasoline blending zone, the high octane reformate is blended with the butanes and the light gasoline fractions produced in the system in sufficient portions to produce gasoline of the desired Reid vapor pressure. The gasoline blend is divided and varying amounts of tetraethyl lead (TEL) are added to produce two grades of finished gasoline of the desired octane number.

About 28,000 b.p.s.d. of the zone 95 bottoms fraction from section 100 is passed through line 109, combined with hydrogen through line 160 and passed to second hydrocracking zone 161 operating on an extinction recycle basis. The effluent from the hydrocracking zone 161 is passed through line 162 to section 103. The vapors boiling above about 650° F. from section 103 are passed through vapor communication means between the upper end of section 103 and the lower end of section 100 and fractionated in section 100 into the respective fractions as indicated in the first paragraph under "Description of FIG. 2." The hydrocracking zone 161 bottoms fraction from the bottom of column 103 is recycled to zone 161 through line 163.

Table II below indicates the net products that are obtained by processing the 50,000 b.p.s.d. of Boscan crude in a manner indicated above under "Decription of FIG. 2."

TABLE II

| | BPSD | LV% [3] |
|---|---|---|
| Refinery Fuel Gas [1] | 4,800 | 9.6 |
| Excess $C_4$'s | 400 | 0.8 |
| Premium Motor Gasoline, 100 F–1+2.8 ml. TEL/gal.[2] | 10,000 | 20.0 |
| Regular Motor Gasoline, 94 F–1+0.75 ml. TEL/gal.[2] | 24,100 | 48.2 |
| Kerosene-type Jet Fuel, 28 ASTM Smoke Point, −75° F. ASTM Freeze Point | 10,000 | 20.0 |
| Diesel Fuel Oil, 55 Cetane Number, −30° F. ASTM Pour Point | 5,000 | 10.0 |
| | 54,300 | 108.6 |

[1] EFO (Equivalent Fuel Oil) is the barrels per stream day (BPSD) of 10° API bunker fuel that would have equivalent heating value in B.t.u., assuming that one barrel of said fuel oil has a heating value of 6.3 M B.t.u.
[2] 10 pounds Reid vapor pressure.
[3] Liquid volume percent based on the crude oil feed.

Table II indicates that the yield of liquid products is about 98 vol. percent obtainable from the Boscan crude by the process of the present invention. This is to be compared with a liquid product yield of approximately 85 vol. percent obtainable from the same feed by conventional process combinations without benefit of the two stage solvent separating and separate hydroprocessing of the solvent separated fractions as in the process of the present invention. In addition to obtaining an exceptionally high yield of high quality liquid products, the process of the present invention operates at a lower pressure and requires less hydrogen than the prior art processes because of the less refractive nature of the various intermediate stocks produced therein, thus resulting in a more economical process. Further, the combination fractionation zones of the process of this invention result in a more efficient and economical process than obtainable by conventional fractionation means.

SUMMARY

From the foregoing description, it may be seen that the process of the present invention is a very efficient and economical method for converting high boiling asphaltic feeds of high metal content into substantially metal-free products. The present invention not only provides a method for producing fractions substantially reduced in metal content, but provides a method for subsequently converting these fractions into exceptionally high yields of finished products of high quality.

Although only specific embodiments of the present invention have been described, numerous variations could be made in those embodiments without departing from the spirit of the invention, and all such variations that fall within the scope of the appended claims are intended to be embraced thereby.

I claim:

1. A process for converting a hydrocarbon feed boiling at least partly above 900° F. and containing at least 2 weight percent asphaltenes and at least 25 p.p.m. metalliferous contaminants expressed as metals, said contaminants being selected from the group consisting of nickel, vanadium, compounds thereof and mixtures thereof, which comprises separating said feed in a solvent separation zone into an oil fraction containing less than 25 p.p.m. of said contaminants expressed as metals, a resin fraction containing between 10 and 50 weight percent of said contaminants in said feed, and an asphaltene fraction containing at least 50 weight percent of said contaminants in said feed, removing from said resin fraction at least 50 weight percent of said contaminants in said resin fraction in a hydrocracking zone in the presence of hydrogen with a catalyst comprising at least one hydrogenating component and a cracking component having no more than weak acidity, said hydrocracking zone being operated on a once-through basis at conditions to convert no more than 50 volume percent of the portion of said resin fraction boiling above 900° F. to materials boiling below 900° F., recovering from the effluent from said hydrocracking zone products, including gasoline and middle distillates boiling below about 650° F., and a hydrocracking zone bottoms fraction boiling above 650° F. having a UOP "K" Characterization Factor below 11.25 and containing greater than 25 volume percent cyclic hydrocarbons selected from the group consisting of aromatics, naphthenes, and mixtures thereof, converting in a thermal cracking zone in the presence of hydrogen between 10–50 volume percent of the portion of the thermal cracking zone feed boiling above 900° F. to materials boiling below 900° F., said thermal cracking zone feed comprising said asphaltene fraction and at least a portion of said hydrocracking zone bottoms fraction, said thermal cracking zone being operated at condtions to convert no more than 10 volume percent of said thermal cracking zone feed to products boiling below 400° F., and recovering from the effluent from said thermal cracking zone as a product at least one fraction boiling below 900° F. substantially free of asphaltenes and said contaminants.

2. A process for converting a hydrocarbon feed boiling at least partly above 900° F. and containing at least 2 weight percent asphaltenes and at least 25 p.p.m. metalliferous contaminants expressed as metals, said contaminants being selected from the group consisting of nickel, vanadium, compounds thereof and mixtures thereof, which comprises separating said feed in a solvent separation zone with a low boiling hydrocarbon solvent into an oil fraction containing less than 25 p.p.m. of said contaminants expressed as metals, a resin fraction containing between 10 and 50 weight percent of said contaminants in said feed, and an asphaltene fraction containing at least 50 weight percent of said contaminants, removing from said resin fraction at least 50 weight percent of said contaminants in said resin fraction in a first hydrocracking zone in the presence of hydrogen with a catalyst comprising at least one hydrogenating component and a cracking component having no more than weak acidity, said first hydrocracking zone being operated on a once-through basis at conditions to convert no more than 50 volume percent of the portion of said resin fraction boiling above 900° F. to materials boiling below 900° F., recovering from the effluent from said first hydrocracking zone products, including gasoline and middle distillates boiling below about 650° F., and a first hydrocracking zone bottoms fraction boiling above 650° F. having a UOP "K" Characterization Factor below 11.25 and containing greater than 25 volume percent cyclic hydrocarbons selected from the group consisting of aromatics, naphthenes and mixtures thereof, converting said oil fraction to products including gasoline and middle distillates boiling below about 650° F. in a second hydrocracking zone in the presence of hydrogen with a hydrocracking catalyst, said second hydrocracking zone being operated at conditions to convert at least 30 volume percent of the portion of said oil fraction boiling above 650° F., to materials boiling below 650° F., converting in a hydrovisbreaking zone in the presence of hydrogen between 10–50 volume percent of the portion of the hydrovisbreaking zone feed boiling above 900° F. to materials boiling below 900° F., said hydrovisbreaking zone feed comprising said asphaltent fraction and at least a portion of said first hydrocracking zone bottoms fraction, said hydrovisbreaking zone being operated at conditions to convert no more than 10 volume percent of said hydrovisbreaking zone feed to products boiling below 400° F., and recovering from the effluent from said hydrovisbreaking zone as a product at least one fraction boiling below 900° F. substantially free of asphaltenes and said contaminants.

3. The process of claim 2 wherein at least a portion of the bottoms fraction from said hydrovisbreaking zone is converted to hydrogen in a partial oxidation zone comprising a gas generator and a shift converter.

4. The process of claim 3 wherein conversion in said hydrovisbreaking zone is controlled to provide substantially only that amount of said bottoms fraction which will, when converted to hydrogen in said partial oxidation zone, provide the amount of hydrogen needed to keep the entire process in overall hydrogen balance.

5. A process as in claim 2, wherein at least a portion of said fraction from said hydrovisbreaking zone is converted in said second hydrocracking zone.

6. A process as in claim 2, wherein said hydrovisbreaking zone feed contains at least 30 volume percent of said first hydrocracking zone bottoms fraction.

7. A process as in claim 2, wherein said hydrocarbon solvent is selected from the group consisting of $C_2$–$C_8$ hydrocarbons and mixtures thereof.

8. A process for converting a hydrocarbon feed boiling at least partly above 900° F. and containing at least 2 weight percent asphaltenes and at least 25 p.p.m. metalliferous contaminants expressed as metals, said contaminants being selected from the group consisting of nickel, vanadium, compounds thereof and mixtures thereof, which comprises converting above 50 volume percent of the portion of said feed boiling above 900° F. to materials boiling below 900° F. in a first hydrovisbreaking zone in the presence of hydrogen and hydrocarbons boiling above 500° F. having a UOP "K" Characterization Factor above 11.5 and containing less than 25 volume percent aromatics, said first hydrovisbreaking zone being operated at conditions to convert no more than 15 volume percent of said feed to products boiling below 400° F., separating from the effluent from said first hydrovisbreaking zone at least one substantially asphaltene-free fraction boiling below about 800° F. containing less than 25 p.p.m. of said contaminants expressed as metals and a residuum fraction boiling within the range 600° F. to above 900° F., separating said residuum fraction in a solvent separation zone with a low boiling hydrocarbon solvent into an oil fraction boiling within the range 600° F. to above 900° F. containing less than 25 p.p.m. of said contaminants expressed as metals, a resin fraction boiling within the range 600° F. to above 900° F. containing between 10 and 50 weight percent of said contaminants in said feed, and an asphaltene fraction containing at least 50 weight percent of said contaminants in said feed, removing from said resin fraction at least 50 weight percent of said contaminants in said resin fraction in a first hydrocracking zone in the presence of hydrogen with a catalyst comprising at least one hydrogenating component and a cracking component having no more than weak acidity, said first hydrocracking zone being operated on a once-through basis at conditions to convert no more than 50 volume percent of the portion of said resin fraction boiling above 900° F. to materials boiling below 900° F., recovering from the effluent from said first hydrocracking zone products, including gasoline and middle distillates boiling below about 650° F., and a hydrocracking zone bottoms fraction boiling above 650° F. having a UOP "K" Characterization Factor below 11.25 and containing greater than 25 volume percent cyclic hydrocarbons selected from the group consisting of aromatics, naphthenes and mixtures thereof, converting said oil fraction and said substantially asphaltene-free fraction from said first hydrovisbreaking zone to products including gasoline and middle distillates boiling below about 650° F. in a second hydrocracking zone in the presence of hydrogen with a hydrocracking catalyst, said hydrocracking zone being operated at conditions to convert at least 30 volume percent of the portion of said fractions boiling above 650° F. to materials boiling below 650° F., converting in a second hydrovisbreaking zone in the presence of hydrogen between 10–50 volume percent of the portion of the second hydrovisbreaking zone feed boiling above 900° F. to materials boiling below 900° F., said hydrovisbreaking zone feed comprising said asphaltene fraction and said resin fraction, said second hydrovisbreaking zone being operated at conditions to convert no more than 10 volume percent of second hydrovisbreaking zone feed to products boiling below about 400° F. and recovering from the effluent from said second hydrovisbreaking zone as a product at least one fraction boiling below about 800° F. substantially free of asphaltenes and said contaminants.

9. A process as in claim 8, wherein at least a portion of said fraction from said second hydrovisbreaking zone is hydrocracked in said second hydrocracking zone.

10. A process as in claim 8, wherein at least a portion of said fraction from said second hydrovisbreaking zone is hydrogenated in a hydrogenation zone to substantially hydrogenate olefinic and aromatic components in said fractions, said hydrogenation zone being operated at conditions to convert no more than 10 volume percent of said fractions to products boiling below 400° F. and wherein a hydrogenation zone bottoms fraction boiling above 500° F. having a UOP "K" Characterization Factor above 11.5 and containing less than 25 volume percent aromatics is recovered as a product from said hydrogenation zone.

11. A process as in claim 10, wherein said feed is hydrovisbroken in said first hydrovisbreaking zone in the presence of at least one volume of said hydrogenation zone bottoms fraction per 10 volumes of said feed.

12. A process for converting a full boiling range hydrocarbon feed containing at least 2 weight percent asphaltenes and at least 25 p.p.m. metalliferous contaminants expressed as metals, said contaminants being selected from the group consisting of nickel, vanadium, compounds thereof and mixtures thereof, which comprises passing said feed into a stripping section of a first combination fractionation zone, said stripping section being in vapor communication with a first bottom section and a second bottom section and said first and second bottom sections being separated by a longitudinal partition to prevent liquid communication therebetween; withdrawing from the top of said stripping section an overhead fraction boiling below about 800° F. containing less than 25 p.p.m. of said contaminants expressed as metals; withdrawing from a total liquid drawoff tray at the bottom of said stripping section a residuum fraction boiling within the range 600° F. to above 900° F.; converting above 50 volume percent of the portion of said residuum fraction boiling above 900° F. to materials boiling below 900° F. in a first hydrovisbreaking zone in the presence of hydrogen and a hydrogenation zone bottoms fraction obtained as hereinafter specified, said first hydrovisbreaking zone being operated at conditions to convert no more than 15 volume percent of said residuum fraction to products boiling bolew 400° F.; passing the effluent from said first hydrovisbreaking zone into said first bottom section; withdrawing from the bottom of said first bottom section a first hydrovisbreaking zone bottoms fraction boiling within the range 600° F. to above 900° F.; separating said first hydrovisbreaking zone bottoms fraction in a primary solvent separation zone with a hydrocarbon solvent, selected from the group consisting of $C_3-C_8$ hydrocarbons and mixtures thereof, into a maltene fraction boiling within the range 600° F. to above 900° F. containing between 10–50 weight percent of said contaminants in said feed, and an asphaltene fraction containing at least 50 weight percent of said contaminants in said feed; separating said maltene fraction in a secondary solvent separation zone into an oil fraction boiling within the range 600° F. to above 900° F. containing less than 25 p.p.m. of said contaminants expressed as metals and a resin fraction boiling within the range 600° F. to above 900° F. containing between 10–50 weight percent of said contaminants; hydrogenating said oil fraction and said overhead fraction in the presence of hydrogen in a hydrogenation zone to substantially hydrogenate olefinic and aromatic components in said fraction, said hydrogenation zone being operated at conditions to convert no more than 10 volume percent of said fractions to products boiling below 400° F.; passing the effluent from said hydrogenation zone into a stripping section of a second combination fractionation zone, said stripping section being in vapor communication with a bottom section; withdrawing from a total liquid draw-off tray at the bottom of said stripping section in said second combination fractionation zone a hydrogenation zone bottoms fraction boiling above 500° F. having a UOP "K" Characterization Factor above 11.5 and containing less than 25 volume percent aromatics; adding a portion of said hydrogenation zone bottoms fraction to said first hydrovisbreaking zone; removing from said resin fraction at least 50 weight percent of said contaminants in said resin fraction in a hydrocracking zone in the presence of hydrogen with a catalyst comprising at least one hydrogenating component and a cracking component having no more than weak acidity, said hydrocracking zone being operated on a once-through basis at conditions to convert no more than 50 volume percent of the portion of said resin fraction boiling above 900° F. to materials boiling below 900° F.; passing the effluent from said hydrocracking zone into said bottom section of said second combination fractionation zone; withdrawing from said bottom section a hydrocracking zone bottoms fraction boiling above 650° F. having a UOP "K" Characteristization Factor below 11.25 and containing greater than 25 volume percent cyclic hydrocarbons selected from the group consisting of aromatics, naphthenes and mixtures thereof; converting in a second hydrovisbreaking zone in the presence of hydrogen between 10–50 volume percent of the portion of the second hydrovisbreaking zone feed boiling above 900° F. to materials boiling below 900° F., said second hydrovisbreaking zone feed comprising said asphaltene fraction and said hydrocracking zone bottoms fraction, said second hydrovisbreaking zone being operated at conditions to convert no more than 10 volume percent of said second hydrovisbreaking zone feed to products boiling below 400° F.; passing the effluent from said second hydrovisbreaking zone into said second bottom section of said first combination fractionization zone; and recovering from said stripping section of said second combination fractionation zone as products at least one gasoline fraction boiling below about 400° F. and at least one middle distillate product fraction boiling within the range of about 320°–650° F.

13. A process as in claim 12, wherein the remaining portion of said hydrogenation zone bottoms fraction is converted to products including gasoline and middle distillates boiling below 650° F. in a second hydrocracking zone in the presence of hydrogen with a hydrocracking catalyst.

References Cited by the Examiner

UNITED STATES PATENTS

| | | | |
|---|---|---|---|
| 2,276,155 | 3/1942 | Carr | 208—6 |
| 2,706,705 | 4/1955 | Oettinger et al. | 208—59 |
| 2,973,313 | 2/1961 | Pevere et al. | 208—86 |
| 3,227,645 | 1/1966 | Faumkin et al. | 208—86 |

DELBERT E. GANTZ, *Primary Examiner.*

ABRAHAM RIMENS, *Examiner.*